United States Patent Office 3,428,617
Patented Feb. 18, 1969

3,428,617
CATIONIC HYDROXY-CONTAINING POLYMERS, PREPARATION AND USE
Igor Sobolev, Orinda, Calif., assignor to Shell Oil Company, New York, N.Y., a corporation of Delaware
No Drawing. Continuation-in-part of application Ser. No. 354,163, Mar. 23, 1964. This application Oct. 19, 1964, Ser. No. 404,963
U.S. Cl. 260—89.5    10 Claims
Int. Cl. C08f 3/62

This application is a continuation-in-part of my application Ser. No. 354,163, filed Mar. 23, 1964 now U.S. Patent 3,329,706.

This invention relates to new polymers and their preparation. More particularly, the invention relates to new cationic hydroxy-containing polymers, to their preparation from unsaturated quaternary ammonium compounds, and to the use of these products, particularly for the treatment of fibrous materials, such as paper, textile materials, leather and the like.

Specifically, the invention provides new and particularly useful polymeric products which possess a positive charge and a plurality of OH groups, said polymer being prepared by polymerizing an ester of an ethylenically unsaturated acid and a dihydroxypropyl (or glycidyl) trialkylammonium halide, alone or in admixture with a dissimilar ethylenically unsaturated monomer, in the presence of a free radical catalyst.

As a special embodiment, the invention provides a new group of cationic hydroxy-containing water-soluble or water dispersible polymers which are outstanding as wet strength agents for paper and as flocculating agents retention aids in the manufacture of paper and the like, which polymers are obtained by polymerizing an ester of an ethylenically unsaturated carboxylic acid, such as acrylic or methacrylic acid, and a glycidyl trialkylammonium halide (or a dihydroxypropyl trialkyl ammonium halide) alone or with a minor amount of an ethylenically unsaturated monomer, in the presence of the free radical catalyst.

As a further special embodiment, the invention provides a process for utilizing the above-noted cationic water-soluble polymers for the treatment of fibrous materials such as paper, to improve properties such as wet strength, abrasion resistance and the like, which comprises impregnating the fibrous material with an aqueous solution of the above-noted polymers, or alternatively utilizing the polymers at some stage during the formation of the said material.

Ordinary paper when wet loses its strength and is easily torn. In order to overcome this shortcoming, it has become common practice to treat the paper with a nitrogen-containing resin, such as urea- or melamine-formaldehyde resin, that can be subsequently cured to form an insoluble resin. While this method has imparted some improvement in wet strength, it still leaves much to be desired for use on a commercial basis. The wet strength provided by this method, for example, is not as high as required for many applications. Also, these known resins are utilized in an acidic medium. This brings about corrosion problems and causes a loss in aging properties of the paper. In addition, the paper stock is not as free on the acid side as desired for efficient operation. Finally, the use of these agents in many cases requires the use of other materials, such as alum. Wet-strength resins are known which are effective under neutral conditions; these, however, are known to interfere with repulping operations.

It is an object of the invention, therefore, to provide a new class of cationic polymers. It is a further object to provide a new class of cationic polymers which are particularly useful both as sizing and wet strength agents for paper. It is a further object to provide new cationic polymers of quaternary ammonium compounds, and a method for their preparation. It is a further object to provide new cationic water-soluble or dispersible polymers. It is a further object to provide new cationic polymers which are particularly useful for treating fibrous materials, such as paper, textiles, and the like to impart size and wet strength thereto. It is a further object to provide new polymers for treating paper which may be used in neutral or alkaline medium. It is still a further object to provide new paper treating agents that may be used without alum and which do not interfere with repulping operations. It is a further object to provide a method for treating fibrous materials, to improve their dimensional stability and wet strength. It is a further object to provide new cationic polymers which are particularly useful as flocculating agents for clays and the like. It is a further object to provide polymers which are useful as retention aids for paper manufacture. It is a further object to provide new fiber-forming polymers which have improved dyeability. These and other objects of the invention will be apparent from the following detailed description thereof.

It has now been discovered that these and other objects may be accomplished by the new cationic hydroxy-containing polymers of the present invention which are prepared by polymerizing an ester of an ethylenically unsaturated acid and a dihydroxypropyl (or glycidyl) trialkylammonium halide, alone or in admixture with a dissimilar ethylenically unsaturated monomer, in the presence of a free radical catalyst. It has been surprisingly found that these polymers and particularly those which are water-soluble or dispersible are outstanding materials for treating fibrous materials as yarns, fibers, textile fabrics, paper and leather to improve their properties. The polymers, for example, have high substantivity to cellulosic materials. As a result, they can be either added at the wet end of paper manufacturing or on the finished paper to give an increase in wet strength and/or abrasion resistance of the paper. The new polymers also act as a sizing agent for the paper and textile material. The new polymers of the invention are also excellent flocculating agents and when used in small amounts are able to cause flocculation or precipitation of dispersed clays, ores and the like. The new polymers are particularly valuable as retention aids for inorganic fillers in paper manufacture. The new polymers which contain fiber-forming monomers, such as acrylonitrile, etc. can be formed into fibers having greatly improved dyeability.

The monomers used in preparing the new polymers of the invention comprise the esters of ethylenically unsaturated carboxylic acids and 2,3-dihydroxypropyl (or glycidyl) trialkylammonium halides. The unsaturated acids used in making the esters are the hydrocarbon carboxylic acids possessing at least one carboxy group and at least one ethylenic linkage, i.e., a non-aromatic carbon-carbon double bond, which ethylenic linkage(s) constitute the only carbon-carbon unsaturation in the molecule. Preferred acids are acrylic lower alkenoic acids which contain from 1 to 2 carboxy groups, from 1 to 2 ethylenic linkages and contain from 3 to 6 carbon atoms including the carboxy carbon atom(s). Illustrative of monocarboxylic alkenoic acids of this type are acrylic acid, methacrylic acid, crotonic acid, 3-pentenoic acid, sorbic acid, 2-methyl-2-butenoic acid, ethacrylic acid and 4-hexenoic acid; while illustrative dicarboxylic alkanoic acids include maleic acid, fumaric acid, citraconic acid, mesaconic acid, itaconic acid, 2-methyleneglutaric acid and 2-pentendioic acid. In general, monocarboxylic acids are preferred over analogous dicarboxylic acids, and further preferred are those monocarboxylic alkenoic acids wherein the ethylenic linkage is conjugated with the carboxy group and is a terminal ethylenic linkage; these are acrylic acid and the alpha-alkyl derivatives thereof wherein the alkyl has from 1 to 3 carbon atoms, particularly 1 carbon atom.

The glycidyl trialkylammonium halide used in making the above esters comprise those compounds having a quaternary nitrogen atom to which are attached three alkyl radicals and a glycidyl, i.e., 2,3-epoxypropyl, radical. The nitrogen, being tetravalent, is positively charged, and in the reactants of the invention is associated by means of an ionic bond with a negatively charged halide ion. Suitable glycidyl trialkylammonium halides contain halogen having an atomic number from 17 to 35, that is, the middle halogens chlorine and bromine, and alkyl groups which independently have from 1 to 12 carbon atoms. Such materials are represented by the formula

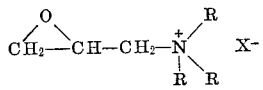

wherein X is middle halogen and R is alkyl having from 1 to 12 carbon atoms. Preferred are glycidyl trialkylammonium halides of the above-depicted formula wherein at least two, more preferably three, of the alkyls are lower alkyl, that is, contain from 1 to 4 carbon atoms. Illustrative of such compounds are glycidyl trimethylammonium chloride, glycidyl triethylammonium bromide, glycidyl dimethylhexylammonium chloride, glycidyl dipropyldecylammonium bromide, glycidyl dimethyllaurylammonium chloride, glycidyldiethylpropylammonium chloride, glycidylmethylethylamylammonium bromide, glycidyltributylammonium chloride, and glycidyl trimethylammonium bromide. In general, quaternary ammonium chlorides are preferred over the corresponding bromides, and most preferred as the quaternary ammonium halide reactant is glycidyl trimethylammonium chloride.

The quaternary ammonium halides are conveniently prepared by reaction of the appropriate trialkylamine and alpha-halo epoxyalkyl compounds in aprotic reaction diluent. For example, from trimethylamine and epichlorohydrin is prepared glycidyltrimethylammonium chloride.

The glycidyl trialkylammonium halides are employed in aqueous solution. Although the presence of other miscible solvents, e.g., alcohols, particularly lower alkanols of from 1 to 4 carbon atoms, does not appear to be overly detrimental to the process of the invention, no advantage is obtained by the use thereof, and in the preferred modification of the process of the invention, only water is present as solvent. The concentration of glycidyl trialkylammonium halide in the aqueous solution is not critical, and concentrations from about 20% to about 90% by weight glycidyl trialkylammonium halide are satisfactorily utilized. Preferred, however, are concentrations from about 50% to about 80% by weight.

Other processes, however, can also be employed for the preparation of these cationic esters.

Dissimilar monomers that may be used in making the new copolymers include those possessing at least one polymerizable ethylenic linkage, such as, for example, maleic acid, maleic acid esters, tetrahaloethylenes, 1,4-butanediol diacetate, 1,4-butenediol dimethacrylate, cyclohexene, 2,2-bis(3-cyclohexenyl)propane and the like. Particularly preferred are the monomers containing at least one terminal $CH_2=C=$ group, such as, for example, alkene-1 as ethylene, propylene, isobutylene, octene-1; alkenyl-substituted aromatics, styrene, alpha-methyl- as styrene, dichlorostyrene, vinyl naphthalene, vinyl phenol, and the like; esters of unsaturated acids, such as alkyl alkenoates as methyl acrylate, methyl methacrylate, butyl methacrylate and propyl acrylate; vinylidene halides, such as vinylidene bromide, vinylidene chloride; vinyl esters of inorganic acids, such as the halogen acids and hydrocyanic acid as vinyl chloride, vinyl bromide, acrylonitrile and methacrylonitrile; vinyl esters of the monocarboxylic acids, such as vinyl acetate, vinyl chloroacetate, vinyl benzoate, vinyl laurate, vinyl valerate, and vinyl caproate; vinyl ethers, such as vinyl ethyl ether, and the vinyl ketones, such as vinyl butyl ketone, and vinyl ethyl ketone.

Especially preferred monomers are the monomers which are neutral or cationic, such as, vinylidene halides, the alkyl esters of acrylic acids and alpha-alkyl substituted acrylic acids wherein the alkyl radical in the alcohol portion of the ester radical contains from 1 to 6 carbon atoms and the alkyl radical substituted on the acrylic acid contains from 1 to 4 carbon atoms, the vinyl esters of the saturated monocarboxylic acids containing from 1 to 6 carbon atoms, the vinyl esters of the halogen acids, isobutylene, acrylonitrile, methacrylonitrile, ethacrylonitrile, styrene, and alpha-methylstyrene. The group also includes the allyl derivatives, such as the allyl esters of the monocarboxylic acids, as allyl acetate and allyl butyrate; the allyl esters of the polycarboxylic acids, such as diallyl phthalate, diallyl adipate, and diallyl succinate; the allyl esters of the inorganic acids, such as allyl chloride, methallyl chloride, etc.; the allyl esters of the unsaturated acids, such as allyl acrylate, allyl crotonate, and methallyl methacrylate, and the allyl ketones, allyl ethers, and the like, monoolefins, diolefins, vinyl pyridines, acrolein, methacrolein, acrylamide, vinyl pyrrolidinone, allylamine, and mixtures thereof. These dissimilar monomers preferably take up from .1% to 50% by weight of the mixture of monomers.

The new polymers may be prepared by a variety of suitable methods. They may be prepared, for example, by contacting the monomers with a free radical yielding catalyst and preferably a peroxide catalyst and a reducing agent.

Examples of free radical yielding catalysts that may be employed include, among others, peroxides, such as benzoyl peroxide, hydrogen peroxide, potassium persulfate, potassium permanganate, methyl cyclohexyl peroxide, alkali perborates, diacetyl peroxide, tertiary butyl hydroperoxide, tertiary amyl hydroperoxide, acetyl benzoyl peroxide, cumene hydroperoxide, tetralin hydroperoxide, phenylcyclohexane hydroperoxide, tertiary-butylisopropyl benezne hydroperoxide, tertiary butyl peracetate, tertiary butyl perbenzoate, ditertiary butyl perphthalate, ditertiary butyl peradipate, tertiary butyl percarbonate and the like. Particularly preferred free radical yielding catalysts include the peroxides, such as the dialkyl peroxides, diaryl peroxides, tertiary alkyl hydroperoxides, alkyl peresters of percarboxylic acids, and particularly those of the above-noted groups which contain not more than 18 carbon atoms per molecule.

The above-described free radical yielding catalysts are employed in small amounts, the exact amount being dependent upon the particular type selected. In general, the amount of catalyst used will vary from about $1 \times 10^{-6}$ to about $2 \times 10^{-2}$ mols per mol of unsaturated monomer to be polymerized. Preferred amounts vary from about $1 \times 10^{-3}$ to $1 \times 10^{-4}$ mols per mol of material being polymerized.

The material employed with the above-described free radical yielding catalyst may include reducing agents, such as, for example, sodium hypophosphite, ferrous salts, sodium bisulfite, hydrazine, and the like.

The amount of the reducing agent employed will vary depending on the amount of the peroxide catalyst employed. It is preferred to have from about .3 mol to 1.5 mol of reducing agent per mol of peroxide catalyst. Preferably, the reducing agent is employed in an amount varying from about .5 to 1 mol per mol of peroxide.

The polymerization process is preferably conducted at a pH of about 2–8 (at lower or higher pH levels hydrolysis of cationic methacrylate may interfere).

Other materials, such as surface-active agents, may also be employed if desired, but are not necessary for operation of the process. Examples of surface active agents include the ionic agents and especially those having a polar structure including a hydrophobic (predominantly hydrocarbon) residue and a charged (ionic) radical thereon, such as cationic surface active compounds.

Non-ionic surface active agents, i.e., those which are not salts and are not subject to ionization when added to water include, among others, partial esters of polyhydric alcohols and saturated or unsaturated fatty acids and preferably fatty acids containing at least and more preferably from 12 to 18 carbon atoms, and hexitans and hexitides such as sorbitan or mannitan monolaurate, monopalmitate, monostearate, monooleate or the monoesters of coconut oil fatty acids and the like products described in U.S. Patent No. 2,322,820. Other examples of partial esters of this type include the pentaerythritol mono- and dipalmitate, pentaerythritol mono- and distearate, pentaerythritol mono- and dioleate, 1,2,6-hexanetriol mono- and dicaproate, 1,2,6-hexanetriol mono- and dioleate, trimethylolpropane distearate, trimethylolpropane dilaurylate, polyglycerol dilaurate, inositol monolaurate, glucose monostearate, sucrose monooleate, polyglycol monooleate, polyglycol monostearate, and the like.

The reaction is preferably accomplished in the presence of solvents such as, for example, water and other polar solvents, such as dimethyl sulfoxide, alcohols, sulfolanes, dimethyl formamide, and the like. These are preferred over non-polar solvents as the cationic monomer is generally not soluble in the latter. Polymerization of the polymers may also be carried out in a hydrocarbon diluent such as pentane, isopentane, hexane, heptane, octane, and the like and the mixtures thereof with other components such as water, mixtures of water and acetone and the like.

In operating the process, all of the ingredients may be added at one time or one or more of the ingredients added to the reactor at a later time or intermittently or continuously throughout the reaction. It is desirable in many cases, and particularly in those cases of copolymerization where one of the monomers polymerizes much faster than the other, to add one or more of the monomers intermittently or continuously throughout the reaction. The monomers may be added so as to keep the ratio of concentration of the monomers substantially constant or as to vary the ratio of concentrations as desired. Copolymers which have substantially homogeneous compositions are particularly desired.

The temperature employed in the process may vary over a considerable range. It is generally preferred to employ relatively low temperatures. In general, the temperatures will vary from the freezing point of the reaction mixture to about 50° C. Preferred temperatures range from about 0° C. to 45° C. Atmospheric, superatmospheric or subatmospheric pressures may be utilized as desired.

The polymerization is preferably effected in an inert atmosphere. This may be preferably accomplished by passing inert gases, such as nitrogen, methane, etc., into and through the reaction gases, such as nitrogen, methane, etc., into and through the reaction mixture.

The process may be conducted batchwise or on a semi-continuous or continuous scale.

The polymers may be recovered from the reaction mixture in a great variety of different ways as by precipitation with solvents such as acetone, extraction, evaporation and the like.

The new polymers have substantially high molecular weights. They will preferably have intrinsic viscosities of at least 0.1 and preferably 0.5 to 5.0 dl./g. These values are determined by the conventional technique of polyelectrolyte (e.g., NaCl or NaNO$_3$) viscosity measurements at 25° C. On a molecular weight basis, such polymers have molecular weights ranging preferably from about 25,000 to 10,000,000 as determined by the light scattering technique. The preferred products have intrinsic viscosities ranging from 0.3 dl./g. to 5.0 dl./g. as determined in 0.5 M NaCl of 25° C. or where applicable, in dimethyl sulfoxide containing 0.25 M tetrabutylammonium bromide at 25° C.

The new polymers possess a positive charge, i.e., they possess a plurality of side chains containing the quaternary ammonium group and the anion, and in addition possess a plurality of OH groups.

The copolymers of the present invention possess many new and unobvious properties which make them useful and valuable in many important applications. As noted hereinabove, the new copolymers are cationic and are frequently water-soluble. As a result, they find many applications in solution or as additives for various types of solutions. For example, they may be used in various aqueous polymerization systems or in various types of impregnation or treating solutions. As noted above, they are particularly useful and valuable as agents for treating fibrous materials, such as paper and the like. In this application, they tend to improve the properties, such as strength, crease resistance, fold endurance and the like. Materials that may be treated include, among others, textile fabrics and fibers, leather, paper, and the like. When used for the treatment of paper, these new water-soluble copolymers impart improved fold endurance and improved wet strength. They are particularly suited for the treatment of paper as they may be used on the alkaline side and without the use of alum as noted above.

The new copolymers may be employed for treatment of fibrous materials in a variety of ways. They are preferably employed as aqueous solutions when applied to the paper. The concentrations of the solutions preferred for this application preferably vary from about 0.1% to 50% aqueous solution.

The water solutions used in the treatment of the fibrous material preferably have a pH of from 2 to 9. As noted above their advantage is particularly evident when used on the alkaline side, even as at pH 7.0 to 9.

Emulsifying agents, water-dispersible binding colloids, plasticizers, anti-oxidants, dyes, fillers, curing agents, etc. may also be included in the aqueous system, but are not essential to obtaining the results set out above.

As indicated above, the aqueous systems containing the new copolymers may be applied to the fibrous materials in any suitable way. If it is desired to apply the solution only to one surface of the material, as for example, when it is desired to treat the back only of a fabric or paper having a face of different material, the application may be effected by spraying as a liquid or gas or by means of rollers, or the compositions may be spread upon the surface by means of a doctor blade. When, however, it is desirable to coat both surfaces of the material, or if the material is to be throughly impregnated with it, the material may be simply dipped in the solution or run through conventional-type padding rollers. The solutions may also be applied locally to the material, for example, by means of printing rollers or by stencilling.

In the case of paper, the copolymers or solutions thereof may be added at any stage during the wet end preparation. By wet end is meant any stage from the time the pulp is added to the water to the time when the pulp makes up more than the water. It is preferred to add the new copolymers at the beater stage. If one adds the new copolymers during the beater stage, the beater operations may be any of those now used for this purpose. One merely needs to pour or otherwise add the polymer directly to the aqueous suspension of pulp either all at once or intermittently over a short period of time. The solid polymer derivatives may also be added directly at this stage.

If the aqueous system is to be applied to the finished paper, it may be added by spraying, by rollers, by dipping or by running the paper through a conventional-type padding apparatus. Amount of pick-up of the solution will vary, but in most cases vary from about 50% to 100% based on the weight of the paper.

After the aqueous solution has been applied to the fibrous material as indicated above, the treated product is dried to effect the cure. The drying may be accomplished by merely rolling or squeezing off the excess solution and then setting the treated product out in the air to dry, or by use of forced air. Temperatures used in the drying may vary from about room temperature, e.g., about 20° C. to 100° C. The period of drying will depend largely on the amount of pick-up and concentration of the polymer solution. In most instances, drying periods of about 1 to 30 minutes should be sufficient.

The above-described process may be utilized for the treatment of any fibrous material. This includes textile material, such as woven fabrics, non-woven fabrics, threads, yarn, cord, and string, paper, leather, films and the like. These materials may be prepared from natural or synthetic materials, such as cotton, linen, natural silk and artificial silk, such as silk obtained from cellulose acetate or other organic esters or ethers of cellulose, rayons, jute, hemp, animal fibers, such as wood, hair, and the like, as well as synthetic materials which include those prepared from polyamides, polyesters, polymers of vinyls, such as acrylonitrile, vinyl chloride, and the like.

The process is particularly suited for use in treating paper to improve properties such as wet strength, burst strength, fold endurance and the like. Examples of such papers include, for example, those prepared from wood, cotton, linen, hemp, jute, mulberry, straw, bamboo, fibers or mixtures thereof, by any of the known processes, such as the sulfate process, soda process, sulfite process and the like. The new copolymers are particularly suited for use in treating sulfite paper. The paper may be colored or white and may be further treated for special applications, and the paper may be pretreated with other resins and the like before application of the new copolymers.

The paper treated according to the process of the invention may be used for a variety of applications such as facial tissue, hand towels, maps, filing cards, construction paper, wrapping paper, containers and the like. Because of its resistance to hydrolysis and relative non-toxic nature, the paper is particularly suited for use in preparing wrapper paper or containers for food.

The new polymers of the invention are also useful for the treatment of fibers and fabrics as in the capacity of warp sizing agents and crease proofing materials, and as adhesives for cellulosic materials as wood, paper, sheets and the like.

The new polymers of the invention are also useful for the treatment of leather goods as tanning agents. The new polymers are effective for all kinds of leather, such as goat skin, calf skin, horse hides and the like.

The new polymers may also be used to form valuable esters, amides, ethers and polyurethane derivatives.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

Unless otherwise indicated, the intrinsic viscosity values reported in the examples are those determined by the conventional technique of polyelectrolyte viscosity measurements at 25° C. using 0.5 M sodium chloride.

EXAMPLE I

This example illustrates the preparation and use of a homopolymer of 2-hydroxy-3-methacrylyloxypropyltrimethylammonium chloride.

A solution of 3.5 parts of 2-hydroxy-3-methacrylyloxypropyltrimethylammonium chloride and 0.01 part potassium persulfate in 5 parts 50% aqueous dimethyl sulfoxide was held under nitrogen at 60° C. for 24 hours. The resulting viscous solution was diluted with water, adjusted to pH 5 and treated with 4 volumes of acetone. The monomer remained in solution under these conditions. The precipitated polymer was washed with acetone and ethanol and dried. The resulting product was a solid white polymer having an intrinsic viscosity of 1.5 dl./g. The yield of polymer was 53%. The polymer was easily dissolved in water.

The use of the above-noted homopolymer as a retention aid is shown in Example V.

EXAMPLE II

This example illustrates the preparation of a homopolymer of 2-hydroxy-3-acrylyloxypropyltrimethylammonium chloride. A solution of 3.7 parts of 2-hydroxy-3-acrylyloxypropyltrimethylammonium chloride and 0.015 part of potassium sulfate in 15 parts 50% aqueous dimethyl sulfoxide was held under nitrogen at 50° C. for 3 days and then for 2 hours at 80–90° C. The viscous product was diluted with water, adjusted to pH 5, and treated with 4 volumes of acetone. The precipitated polymer was washed with acetone and ethanol and dried. The resulting product was a white solid polymer having an intrinsic viscosity of 1.2 dl./g.

The use of this polymer as a retention aid in paper manufacture is shown in Example V.

EXAMPLE III

This example illustrates the preparation of a copolymer of 2-hydroxy-3-methacrylyloxypropyltrimethylammonium chloride and acrylamide.

A solution was prepared under nitrogen from the following: 6.9 parts of 2-hydroxy-3-methacrylyloxypropyltrimethylammonium chloride, 10 parts of 0.02 M sodium acetate, 40 parts water, 10 parts acrylamide, 0.01 part potassium persulfate, and 0.01 part sodium meta-bisulfite. The initial pH was 5. The mixture was stirred for 15 minutes at which time the temperature rose from 22° C. to a maximum of 50° C. and the viscosity increased to a very high level. The product was allowed to cool at room temperature and then the resulting stiff gel was dissolved in water. The polymer was isolated by precipitation with excess ethanol. The resulting product was a white solid having an intrinsic viscosity of 2.8 dl./g. Analysis indicated the copolymer had a 2-hydroxy-3-methacrylyloxypropyltrimethylammonium chloride content of 39%.

The use of this copolymer as a retention aid is illustrated in Example V.

EXAMPLE IV

This example illustrates the preparation of a copolymer of 2-hydroxy-3-methacrylyloxypropyltrimethylammonium chloride and acrolein.

A solution was prepared under nitrogen from the following: 25 parts of 0.02 M sodium acetate, 25 parts dimethyl sulfoxide, 12 parts 2-hydroxy-3-methacrylyloxypropyltrimethylammonium chloride, 16.8 parts acrolein, and 0.2 part sodium meta bisulfite. The initial pH was 5.1. The solution was agitated under nitrogen at room temperature. After two days 0.05 part each of potassium sulfate and sodium metabisulfite was added and the solution was agitated at room temperature for an additional two days. Treatment of the viscous product solution with excess ethanol precipitated the polymer. The resulting product was a white solid copolymer having an intrinsic viscosity of 0.9 dl./g. Nitrogen analysis indicated that the amount of 2-hydroxy-3-methacrylyloxypropyltrimethylammonium chloride in the copolymer was 34%.

Films obtained by evaporation of the aqueous solution of the copolymer at 80° C. under vacuum swelled but did not dissolve in water. The use of the above-described copolymer as a retention aid in paper manufacture is shown in Example V.

EXAMPLE V

This example illustrates the use of the above-described polymers as retention aids in paper manufacture.

A bleached kraft pulp was beaten to 705 ml. S-R freeness. Additives were incorporated in the 0.5% pulp slurry in the following order: alum 2% on pulp, fortified rosin size 1%, titanium dioxide 5%, and the retention aid noted below added as an 0.1% solution. The titanium content of the filled sheets was determined by X-ray fluorescence.

The following results were obtained with 0.1 lb. and 0.5 lb. polymer added per ton of pulp:

| Polymer Prepared as Described in— | Intrinsic Viscosity | Retention of TiO$_2$, Percent | |
|---|---|---|---|
| | | 0.1 lb./ton | 0.5 lb./ton |
| Example I | 1.5 | 41 | 42 |
| Example II | 1.2 | 41 | 40 |
| Example III | 2.8 | 38 | 40 |
| Example IV | 0.9 | 37 | 40 |
| None—Control | | 35 | |

The above results are superior to those obtained with commercial retention aids.

EXAMPLE VI

This example illustrates the preparation of two copolymers of acrolein and 2-hydroxy-3-methacrylyloxypropyltrimethylammonium chloride.

(A) An aqueous solution of the following components was prepared and diluted with water to 50 parts: 4.3 parts of 2-hydroxy-3-methacrylyloxypropyltrimethylammonium chloride 8.3 parts acrolein, 2 parts of a solution 0.5 M in $NaH_2PO_2$ and 0.05 M in $CuSO_4$, 0.5 part in $H_2SO_4$ and 0.27 part potassium persulfate. The solution was stirred under nitrogen for 15 hours at 22° C., then for 1 hour at 55° C. The resulting solution was treated with ethanol to precipitate the polymer. The polymer was a white solid having an intrinsic viscosity of 0.07 dl./g. Nitrogen analysis of the latter indicated 2-hydroxy - 3 - methacrylyloxypropyltrimethylammonium chloride content of 34% and acrolein 66%.

(B) In second similar experiment, the same quantities were used, but the sodium hypophosphite reducing agent and copper sulfate catalyst were replaced by 0.27 g. sodium metabisulfite. Acrolein conversion was 57%. The 2-hydroxy - 3 - methacrylyloxypropyltrimethylammonium chloride content of the copolymer was 35%. The viscosity of the total polymer solids was 0.11 dl./g.

EXAMPLE VII

This example illustrates the preparation of a copolymer of acrolein and 2-hydroxy-3-acrylyloxypropyltrimethylammonium chloride. A solution was prepared from the following: 30 parts water, 4.3 parts 2-hydroxy-3-acrylyloxypropyltrimethylammonium chloride, 1.5 parts of a solution 0.5 M in $NaH_2PO_2$ and 0.05 M in $CuSO_4$, 0.3 part 1 N $H_2SO_4$, 0.2 part $K_2S_2O_8$ and 5.8 parts acrolein. The solution was stirred under nitrogen for 17 hours at room temperature. The final pH was 4.2. Solids analysis indicated an acrolein conversion of 43%. Precipitation of the polymer with excess ethanol gave a product (60% of initial solids) containing 33% of the trimethylammonium chloride monomer by nitrogen analysis and 32% by chloride analysis.

EXAMPLE VIII

This example illustrates the performance of the above-noted cationic copolymers as wet strength additives for paper. Bleached sulfate pulp was beaten to 700 ml. S-R freeness and diluted to 0.5% consistency. The polymers were added as 1% solutions. Hand sheets were made in a noble and wood sheet machine in the usual manner and dried on a drum dryer at 105° C. for 6 minutes. Dry strength tests were carried out on sheets conditioned for 24 hours at 25° C. and 50% rel. humidity. Wet strength tests were carried out on sheets soaked in distilled water for 4 hours at 23° C. The copolymers gave the following results:

| Copolymer | Percent on Pulp | Burst, p.s.i. | | Tensile, lb./in. | |
|---|---|---|---|---|---|
| | | Dry | Wet | Dry | Wet |
| Control | 0 | 36 | <2 | 22 | <1 |
| Example VI(A) | 0.4 | 47 | 10 | 27 | 4.0 |
| | 0.8 | 39 | 14 | 26 | 5.0 |
| | 3.2 | 48 | 23 | 28 | 7.2 |
| Example VI(B) | 0.8 | 49 | 13 | 28 | 4.6 |
| | 1.6 | 48 | 17 | 31 | 6.2 |
| | 3.2 | 50 | 20 | 31 | 6.3 |
| Example VII | 0.5 | 39 | 7 | | |
| | 1.0 | 41 | 13 | | |
| | 2.0 | 48 | 18 | | |

EXAMPLE IX

This example illustrates the preparation of a copolymer of 2-hydroxy-3-methacrylyloxypropyltrimethylammonium chloride and acrylonitrile. A solution was prepared by mixing 8.0 parts of acrylonitrile, 0.5 part of the above-noted trimethylammonium chloride, 28.4 parts of dimethyl formamide and 0.02 part of azo-bis-isobutyronitrile. This mixture was held under nitrogen at 50° C. for 3 days. The resulting polymer was purified by precipitation with methanol. The polymer was obtained in 69% yield. Chlorine analysis indicated the trimethylammonium chloride content of the polymer was 1.2%. The intrinsic viscosity in dimethyl sulfoxide was 1.1 dl./g.

Films of the above copolymer were cast from dimethyl sulfoxide solution and treated with Alizarin Blue SAP (C.I. 1054), an anthraquinone derivative containing two aromatic sulfonate groups. The copolymer film was dyed a deep blue. A related film prepared solely from a homopolymer of acrylonitrile prepared in the same manner as above without the trimethylammonium chloride monomer was colorless after being treated with the above dye.

EXAMPLE X

Example IX is repeated with the exception that the acrylonitrile is replaced with methacrylonitrile. Related results are obtained.

EXAMPLE XI

Example X is repeated with the exception that the acrylonitrile is replaced with styrene. Related results are obtained.

EXAMPLE XII

This example illustrates the preparation of a copolymer of 2-hydroxy-3-methacrylyloxypropyltrimethylammonium chloride and N-vinyl pyrrolidone and its use as a wet strength for paper.

To 100 parts of a deoxygenating aqueous solution containing 4 parts of 2-hydroxy-3-methacrylyloxypropyltrimethylammonium chloride and 16 parts of N-vinyl pyrrolidone were added 0.5 part 1 M sulfuric acid, 1 part 1 M sodium hypophosite, 0.27 part potassium persulfate and 1 part 0.1 M cupric nitrate solution. This solution was briefly swept with nitrogen and allowed to stand under nitrogen for 40 hours at room temperature. At the end of that period, the solution was precipitated with acetone. The resulting copolymer is a white solid copolymer having a high intrinsic viscosity. The copolymer was soluble in water.

EXAMPLE XIII

This example illustrates the preparation of a copolymer of 2-hydroxy-3-methacrylyloxypropyltrimethylammonium chloride and stearyl methacrylate.

To 100 parts of an aqueous solution containing 4 parts of 2-hydroxy-3-methacrylyloxypropyltrimethylammonium chloride and 16 parts of stearyl methacrylate were added 0.5 part 1 M sulfuric acid, 1 part 1 M sodium hypophosphite, 0.27 part potassium persulfate and 1 part 0.1 M cupric nitrate solution. This solution was briefly swept with nitrogen and allowed to stand under nitrogen for 40 hours at room temperature. At the end of that period, acetone was added to precipitate the copolymer. The resulting copolymer is a white solid having a high intrinsic viscosity.

EXAMPLE XIV

Examples I–VI are repeated with the exception that 2-hydroxy-3-methacrylyloxypropyltrimethylammonium chloride is replaced with each of the following: 2-hydroxy-3-acrylyloxypropyltrimethylammonium bromide, 2-hydroxy-3-ethacrylyloxydimethylhexylammonium bromide, 2-hydroxy-3-crotonyloxydibutylethylammonium iodide, 2-hydroxy-3-acrylyloxydimethyllaurylammonium bromide. Related results are obtained.

I claim as my invention:

1. A cationic hydroxy-containing homopolymer of an ester of an alkenoic acid containing from 3 to 6 carbon atoms and glycidyl trialkylammonium chloride wherein each of the alkyl radicals contains from 1 to 12 carbon atoms, said cationic hydroxy-containing polymer having an intrinsic viscosity ranging from 0.3 dl./g. to 5.0 dl./g. as determined in 0.5 M NaCl at 25° C.

2. A cationic hydroxy-containing homopolymer of an unsaturated ester of the formula

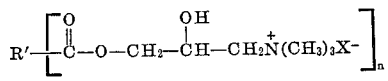

wherein R' is a radical having from 2 to 5 carbon atoms and from 1 to 2 ethylenic linkages, X is halogen having an atomic number from 17 to 35, and $n$ is a whole number from 1 to 2 inclusive with the provision that when $n$ is 2, R' has no more than 4 carbon atoms, said cationic hydroxy-containing homopolymer having an intrinsic viscosity ranging from 0.3 dl./g. to 5.0 dl./g. as determined in 0.5 M NaCl at 25° C.

3. A cationic hydroxy-containing homopolymer of 2-hydroxy-3-alkenoyloxypropyltrialkylammonium halide wherein said alkenoyl moiety has from 3 to 6 carbon atoms and from 1 to 2 ethylenic linkages, each of said alkyls has from 1 to 4 carbon atoms, and said halogen has an atomic number of from 17 to 35, said cationic hydroxy-containing homopolymer having an intrinsic viscosity ranging from 0.3 dl./g. to 5.0 dl./g., as determined in 0.5 M NaCl at 25° C.

4. Homopolymerized 2-hydroxy-3-alkenoyloxypropyltrialkylammonium halide wherein each alkyl group contains from 1 to 12 carbon atoms and the polymer has an intrinsic viscosity ranging from 0.3 dl./g. to 5.0 dl./g. as determined in 0.5 M NaCl at 25° C.

5. Poly(2-hydroxy-3-methacrylyloxypropyltrimethylammonium chloride) having an intrinsic viscosity ranging from 0.5 dl./g. to 5.0 dl./g. as determined in 0.5 M NaCl at 25° C.

6. Poly(2-hydroxy-3-acrylyloxypropyltrimethylammonium chloride) having an intrinsic viscosity ranging from 0.5 dl./g. to 5.0 dl./g. as determined in 0.5 M NaCl at 25° C.

7. A process for preparing a cationic polymer of an ester of an ethylenically unsaturated carboxylic acid and glycidyl trialkylammonium halide, which comprises contacting the monomer in a aqueous medium with a free radical yielding catalyst.

8. A process for treating fibrous paper materials to improve the wet strength properties thereof which comprises applying to the fibrous material an aqueous solution of a cationic hydroxy-containing polymer of the group consisting of (1) homopolymers of an ester of an alkenoic acid containing from 3 to 6 carbon atoms and a glycidyl trialkylammonium halide wherein each alkyl group contains from 1 to 12 carbon atoms, and (2) a copolymer of the ester defined in (1) above and a dissimilar ethylenically unsaturated monomer, wherein the ester under (1) makes up from .1% to 50% by weight of the copolymer said homopolymers and copolymers having an intrinsic viscosity ranging from 0.3 dl./g. to 5.0 dl./g. as determined in 0.5 M NaCl at 25° C.

9. A process for treating fibrous paper material to improve wet strength properties thereof which comprises applying to the said material an aqueous solution of a water-soluble cationic copolymer of 2-hydroxy-3-alkenoyloxyalkyltrialkylammonium chloride wherein each alkyl group contains from 1 to 12 carbon atoms and acrylamide, wherein the 2-hydroxy-3-alkenoyloxyalkyltrialkylammonium chloride makes up from .1% to 50% by weight of the copolymer and the copolymer has an intrinsic viscosity of from 0.3 dl./g. to 5.0 dl./g. as determined in 0.5 M NaCl at 25° C.

10. A process for treating fibrous paper material to improve wet strength properties thereof which comprises applying to the said material an aqueous solution of a water soluble cationic copolymer of 2-hydroxy-3-alkenoyloxypropyltrialkylammonium chloride wherein each alkyl group contains from 1 to 12 carbon atoms and acrolein wherein the 2-hydroxy-3-alkenoyloxypropyltrialkylammonium chloride makes up from .1% to 50% by weight of the copolymer and the copolymer has an intrinsic viscosity of from 0.3 dl./g. to 5.0 dl./g. as determined in 0.5 M NaCl at 25° C.

References Cited

UNITED STATES PATENTS

| | | | |
|---|---|---|---|
| 2,484,487 | 10/1949 | Caldwell | 260—486 |
| 2,630,427 | 3/1953 | Hwa | 260—86.7 |
| 2,676,166 | 4/1954 | Webers | 260—86.1 |
| 2,980,657 | 4/1961 | Melamed | 260—86.1 |
| 2,810,713 | 10/1957 | Melamed | 260—80.3 |

JAMES SEIDLECK, *Primary Examiner.*

U.S. Cl. X.R.

117—139.5, 155, 139.4; 162—168; 210—54; 260—85.5, 73, 78.5, 86.1, 63, 29.6